United States Patent
Gebhart

(10) Patent No.: US 9,709,332 B1
(45) Date of Patent: Jul. 18, 2017

(54) SELF-ALIGNING SUPPORT SYSTEM FOR A ROTATING BODY

(71) Applicant: Walter Gebhart, Ennismore (CA)

(72) Inventor: Walter Gebhart, Ennismore (CA)

(*) Notice: Subject to any disclaimer, the term of this patent is extended or adjusted under 35 U.S.C. 154(b) by 0 days.

(21) Appl. No.: 15/065,183

(22) Filed: Mar. 9, 2016

(51) Int. Cl.
*F16C 19/50* (2006.01)
*F27B 7/22* (2006.01)
*F16H 13/04* (2006.01)

(52) U.S. Cl.
CPC ........... *F27B 7/2206* (2013.01); *F16H 13/04* (2013.01); *F27B 2007/2273* (2013.01)

(58) Field of Classification Search
CPC .................. F16C 19/507; F27B 7/2206; F27B 2007/2246; F27B 2007/2253; F27B 2007/2266; F27B 2007/228
See application file for complete search history.

(56) References Cited

U.S. PATENT DOCUMENTS

| | | | | |
|---|---|---|---|---|
| 974,964 A * | 11/1910 | Helbig | ..................... | F16C 13/04 144/208.9 |
| 3,517,915 A * | 6/1970 | Deynat | ................... | F16C 13/04 248/130 |
| 4,605,320 A * | 8/1986 | Gossner | ................... | B23Q 1/76 384/494 |
| 4,917,344 A * | 4/1990 | Prechter | ................... | A61N 5/10 248/664 |
| 5,146,795 A | 9/1992 | Gebhart | | |
| 5,148,238 A | 9/1992 | Gebhart | | |
| 5,491,553 A | 2/1996 | Gebhart | | |
| 6,447,289 B1 * | 9/2002 | Boyne | ....................... | F27B 7/22 432/103 |
| 6,644,859 B2 * | 11/2003 | Korting | ................... | F16C 13/04 384/549 |
| 7,472,877 B2 | 1/2009 | Hawkins et al. | | |
| 7,963,701 B2 | 6/2011 | Gebhart | | |
| 7,997,153 B2 | 8/2011 | Gebhart | | |
| 8,201,313 B1 * | 6/2012 | Girard | ................... | F27B 7/2206 29/407.09 |
| 8,407,896 B2 | 4/2013 | Gebhart | | |

(Continued)

FOREIGN PATENT DOCUMENTS

CA       2028505 A1    4/1992

OTHER PUBLICATIONS

Webpage downloaded from MAXAM Equipment website entitled "TrooTrac Asphalt Drum Trunnions —Self Aligning" [online]. Accessed on Mar. 9, 2017. Retrieve from: http://maxamequipment.com/asphalt_plant_products/trootrac-asphalt-drum-trunnions/.

*Primary Examiner* — Thomas R. Hannon
(74) *Attorney, Agent, or Firm* — Bereskin & Parr LLP

(57) ABSTRACT

An apparatus for rotatably supporting a rotating cylindrical body. The apparatus comprises a pair of roller assemblies for supporting an annular bearing surface of a rotating cylindrical body. Each of the roller assemblies comprises a cylindrical roller having a circumferential bearing surface in supporting engagement with the annular bearing surface of the rotating body; first and second shaft extensions extending from the roller; bearings for rotatably supporting the first and second shaft extensions; and a pivot plate for supporting the bearings, the pivot plate being pivotally attached to a base by a pivot pin such that the cylindrical roller self-adjusts to the annular bearing surface of the rotating body.

20 Claims, 15 Drawing Sheets

(56) References Cited

U.S. PATENT DOCUMENTS

| | | |
|---|---|---|
| 8,485,052 B2 | 7/2013 | Gebhart |
| 8,622,353 B1 * | 1/2014 | Chielens ................ F16C 13/04 |
| | | 248/130 |
| 8,640,554 B2 | 2/2014 | Gebhart |

* cited by examiner

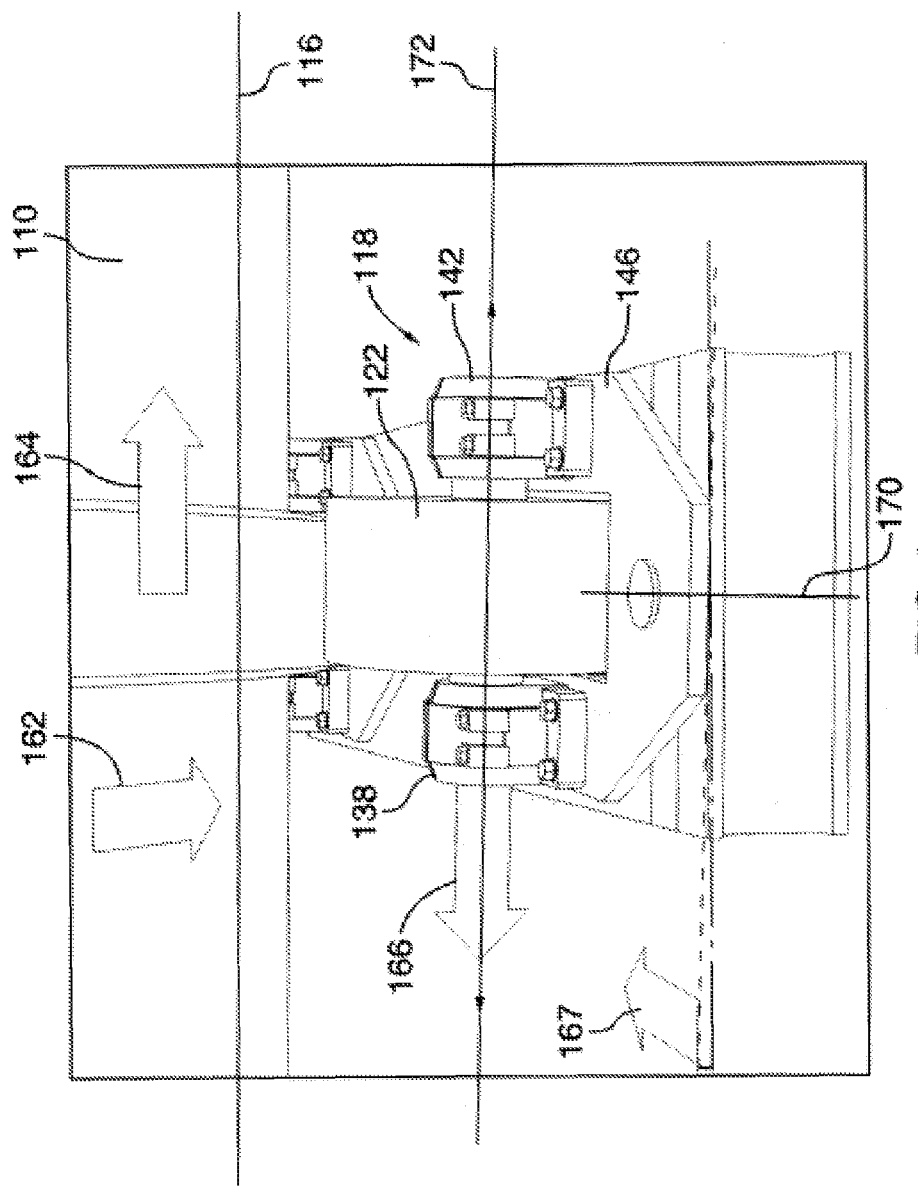

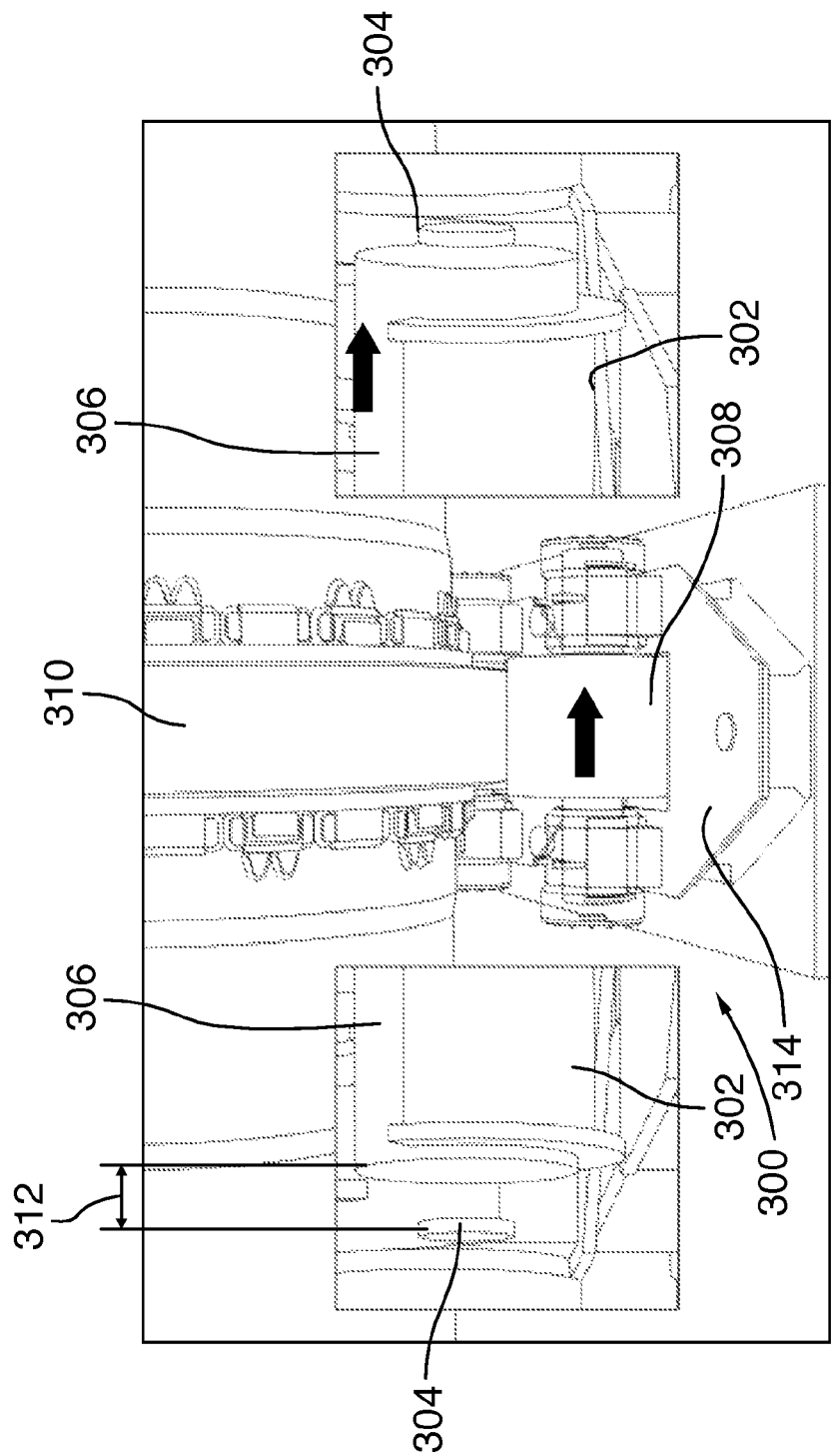

SELF-ALIGNING SUPPORT SYSTEM FOR A ROTATING BODY

TECHNICAL FIELD

The embodiments disclosed herein relate to supporting rotating bodies, and, in particular to a self-aligning support system for a rotating body.

INTRODUCTION

This disclosure relates to a roller support mechanism and method for supporting a rotating body, particularly a large rotating body such as a hot, rotary kiln.

Large rotating cylinders are used in carrying out a large number of economically important processes. Such rotary, trunnion supported equipment typically includes a steel tube that may be quite long (up to several hundred feet in length), and that is supported by annular tires spaced along the length of the tube. These tires can be up to 25 feet in diameter or larger. Each tire is carried on a pair of opposed rollers, which in turn may be mounted upon a concrete pier or pad. The steel tube is rotated about its longitudinal axis, and is supported for such rotation by contact of the rollers with the tires surrounding the tube. The rollers are supported upon the piers or pads by roller support bearings. These are typically sleeve bearings on the larger equipment and anti-friction bearings on smaller sized equipment.

Due to the wear and tear of the roller support bearings, the rollers, and the tires, and distortion of various parts of the system (including possible movement of the piers or pads upon which such rotary equipment is mounted), the rollers can get out of alignment so as to cause the equipment to rotate with greatly increased stresses and friction. Since the cost of replacing the bearings or rollers, or both, is relatively high, an important consideration in the operation of such rotary equipment is the maintenance of proper alignment between the surface of a roller and the supporting tire to prevent uneven wearing of the respective surfaces and overloading the bearings. If the two are kept in proper alignment, a long life can be expected from the tire and the rollers and the bearings.

Alignment relationships are complicated by the fact that such rotary equipment is typically constructed with the tube on a slight slope relative to horizontal to facilitate the flow of material therethrough. Thus, the tube exerts an axial force due to gravity (as well as other axial loads that may be place upon it in operation), thereby causing an axial thrust load to exist on the rollers and their associated roller support bearings whenever they are required to counteract gravity to keep the tube running on the rollers. In order to maintain proper alignment between the tube and roller support bearings, it has previously been necessary to periodically check the alignment by visual inspection or by sophisticated alignment measurements, to determine roller axial position as best possible.

Since such measurements can never be accurate enough, incremental roller adjustments for skew are made until the roller shifts axially into a desired position that is approximately parallel with the axis of the tube. Sleeve bearing arrangements are configured to allow an axial shift of the roller and shaft assembly of approximately 6 mm for this purpose. In this way, the skew adjustment causes this axial shift whenever the neutral skew position is crossed. However, this method is inadequate whenever antifriction bearings are employed, because they are required to be locked to the roller shaft either by shrinking or other mechanical means. No allowance for physical axial shift between the bearing and shaft exists. Since the amount of skew adjustment to cause a roller to shift axially is on the order of 0.1 mm (0.004 inches) or even less, no matter what size of roller, even as large as 10 feet in diameter, it is all but impossible to measure skew since the axis of rotation of the tube can never by physically established to that fineness. Since anti-friction bearings by their very design do not allow any such axial shift, the checks must be made relatively often, are difficult to evaluate, very subjective, and in most instances are not dependably carried out by the operator.

SUMMARY

A method and apparatus for support roller self-alignment which rotatably supports a rotating body. The apparatus is a pivot plate onto which each support roller, fitted with two bearings, is mounted. The pivot plate is mounted between the roller's support bearings and the structural support frame normally found with such assemblies. The pivot plate is pinned in such fashion that the axial thrust force generated by a misaligned or skewed roller drives the roller support assembly towards the aligned or neutral skewed position. As the assembly approaches the neutral skew, aligned position the axial thrust force is proportionately reduced and diminishes to zero when the aligned position is attained.

According to some embodiments, there is an apparatus for rotatably supporting a rotating cylindrical body, the apparatus comprising: a pair of roller assemblies for supporting an annular bearing surface of a rotating cylindrical body, each of the roller assemblies comprising: a cylindrical roller having a circumferential bearing surface in supporting engagement with the annular bearing surface of the rotating body; first and second shaft extensions extending from the roller; bearings for rotatably supporting the first and second shaft extensions; and a pivot plate for supporting the bearings, the pivot plate being pivotally attached to a base by a pivot pin such that the cylindrical roller self-adjusts to the annular bearing surface of the rotating body.

The pivot pin may be located in line with the center of where the circumferential bearing surface is in contact with the annular bearing surface. The pivot plate may be mounted such that if the rotation axis of the roller is not parallel to the rotation axis of the rotating body, the roller produces an axial thrust force on the rotating body, and the pivot plate pivots to drive the roller in the opposite direction as a reactionary force to the axial thrust force.

The pivot plate may pivot due to the reactionary force and is driven towards an aligned position, which when reached, reduces the reactionary force to zero.

The base may include a base extension for supporting the pivot pin, and wherein the base is anchored to a foundation.

The rotating body may be horizontal and the apparatus includes a pair of thrust rollers exhibiting gaps between the thrust rollers and the bearing surface.

The pivot plate may have an underside with reduced friction.

The pivot plate may have two layers, a first layer for supporting the bearings and a second layer having low friction and high heat resistance.

The rotating body may be installed on an incline relative to the horizontal and wherein the apparatus includes a downhill thrust roller in full contact and running continuously on the bearing surface.

The rotating body may be installed on an incline relative to the horizontal and wherein each roller assembly has an axial adjustor to fix the pivot plate for each roller assembly such that the combined thrust generated by all the roller assemblies equals the gravitational pull on the rotating body. The axial adjustor may lock the pivot plate with an axial fixing screw to establish axial balance of the rotating body.

The bearings may be spherical roller bearings. The bearings may be sleeve bearings and button style thrust bearings.

The support assembly may allow free axial travel of the shaft extensions in the sleeve bearings when the rotating body is a 100% thrust kiln.

Where a lack of uniformity of contact between the bearing surface of the rotating body and the circumferential bearing surface creates a gap between the roller and the bearing surface, the apparatus may further comprise a corrective shim placed under the bearings sized to angle the roller assembly based on the size of the gap.

The pivot pin may have a pivot axis that is generally perpendicular to the axis of rotation of the rotating body.

The rotating body may have a tire having the bearing surface, wherein the tire is mounted on the rotating body having bends causing the tire to wobble, and wherein the roller assemblies pivot on the pivot plate to allow the position of a roller axis to dynamically respond and move with a tire rotation axis, seeking to maintain a zero thrust load.

The rotating body may include any one of a rotary kiln, a rotary cooler, a rotary dryer, a rotary furnace, a rotating reactor, a rotary filter, a bean conditioner, a corn conditioner, a rotary ash cylinder, a trunnion supported rotary mill, a de-lacquering drum, a washer, a debarking drum, a pelletizer, a coal breaker, a granulator, an incinerator, or a shakeout drum.

According to some embodiments, there is a roller assembly for supporting an annular bearing surface of a rotating cylindrical body, the roller assembly comprising: a cylindrical roller having a circumferential bearing surface in supporting engagement with the annular bearing surface of the rotating cylindrical body; first and second shaft extensions extending from the roller; bearings for rotatably supporting the first and second roller shaft extensions; and a pivot plate for supporting the bearings, the pivot plate being pivotally attached to a base by a pivot pin such that the cylindrical roller self-adjusts to the annular bearing surface of the rotating body.

The pivot pin may be located in line with the center of where the circumferential bearing surface is in contact with the annular bearing surface.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 4 is a perspective view of the roller assembly of FIG. 3 in use;

FIGS. 11A and 11B are side views of a roller assembly having sleeve bearings, in accordance with an embodiment.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

Although the discussion herein and illustrations mostly depict a rotary kiln, the present disclosure is applicable to any rotating body supported on trunnion rollers. Such rotating bodies include, for example, rotary kilns, rotary coolers, rotary dryers, rotary furnaces, rotating reactors, rotary filters, bean conditioners, corn conditioners, rotary ash cylinders, trunnion supported rotary mills, de-lacquering drums, washers, debarking drums, pelletizers, coal breakers, granulators, incinerators, and shakeout drums, among others.

Figure 1:
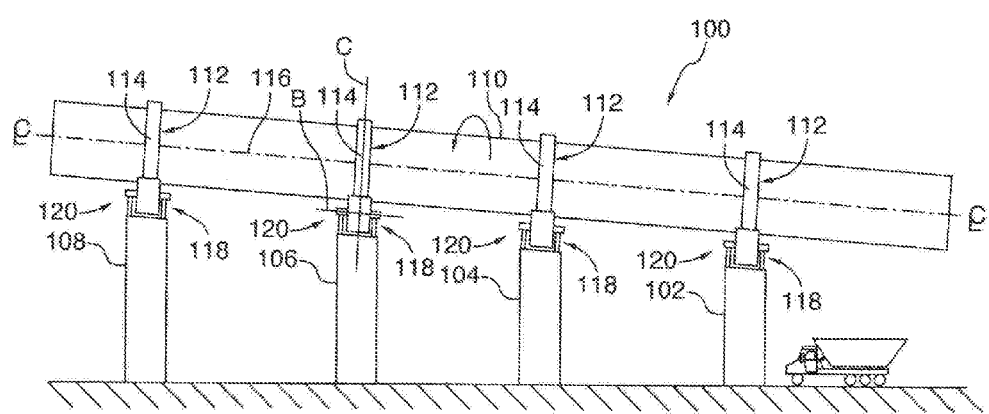
FIG. 1 is a side elevation view of a rotary kiln, according to one embodiment.

Referring to FIG. 1, illustrated therein is a rotary drum 100 on an incline, being generally of a high length to diameter ratio, is rotatably mounted upon piers 102, 104, 106 and 108. Rotary drum 100 has a rotating cylindrical body 110 such as a rotatable tube or shell. Adjacent each pier, the rotating body 110 has a tire 112 which defines an annular bearing surface 114 which is generally cylindrical and coaxial to a longitudinal rotation axis 116 of the rotating body 110. The bearing surface 114 of each tire 112 is supported by a pair of roller assemblies 118 and 120. The roller assemblies 118 and 120 are arranged in pairs along the length of the rotating body 110, are aligned and configured to support the rotating body 110, and are generally identical. Depending on the size of the rotary drum 100 each pair of roller assemblies 118 and 120 may carry a load of over 1000 tons. The roller assemblies 118 and 120 may operate 24 hours a day for most days every year.

Figure 2A:
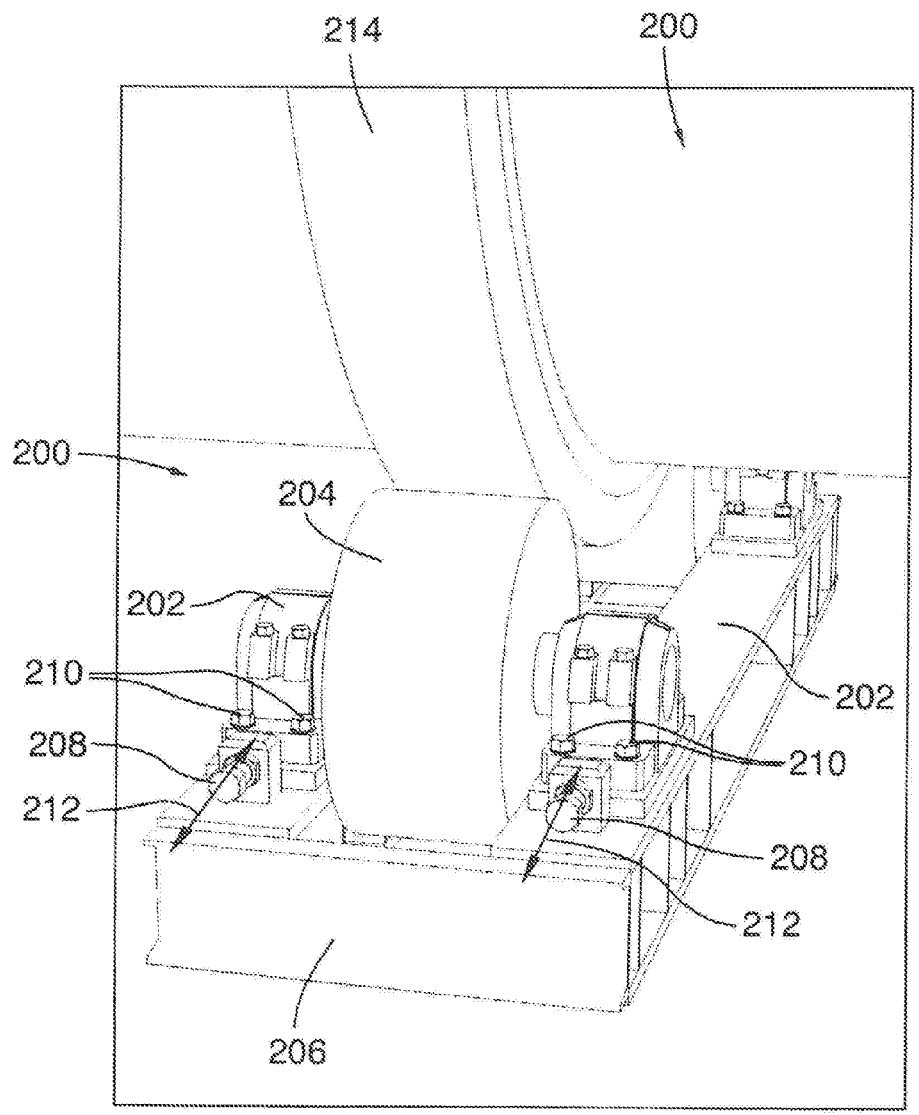
FIGS. 2A and 2B are a perspective views of conventional support assemblies.
Figure 2B:
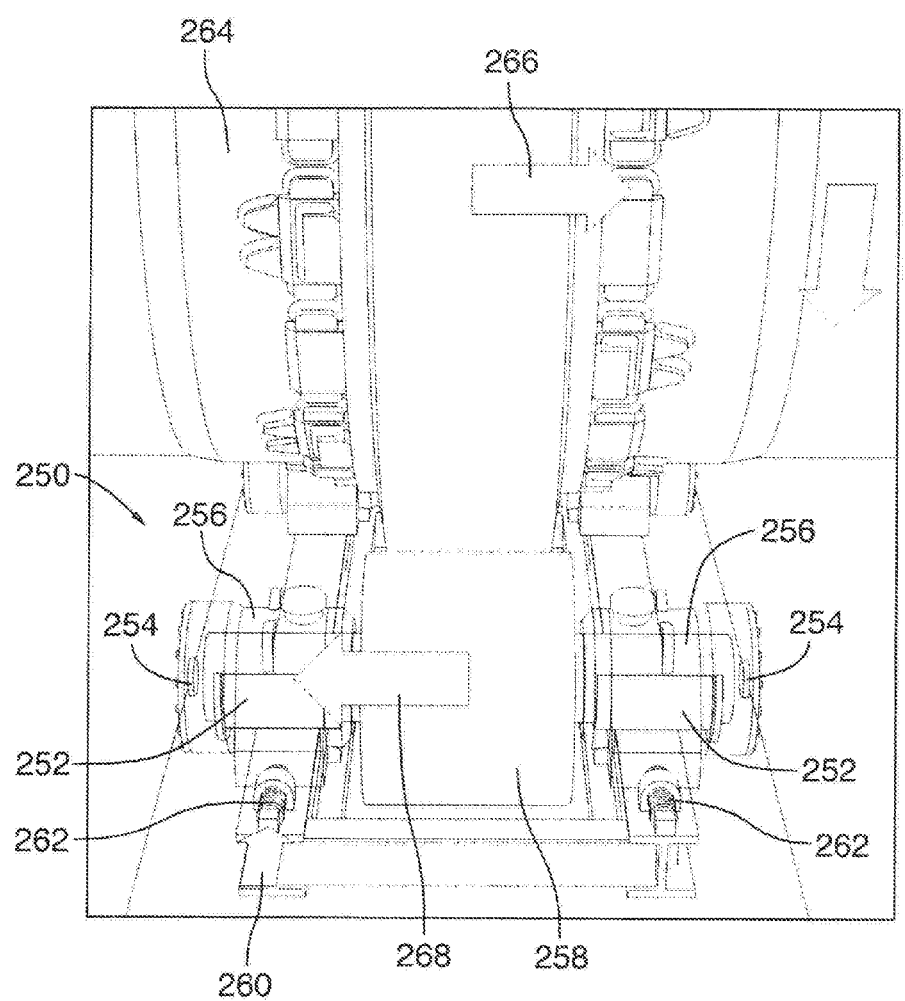

FIGS. 2A and 2B illustrate a conventional support assemblies 200, 250 respectively having spherical roller bearings 202 (FIG. 2A) or sleeve bearings 252 (FIG. 2B).

FIG. 2A illustrates the conventional support assembly 200 having a roller 204, a base 206, the spherical roller bearings 202, and manual skew adjustors 208. The conventional support assembly 200 is typically found on rotary coolers, rotary dryers, rotary furnaces, rotating reactors, rotary filters, bean conditioners, corn conditioners, rotary ash cylinders, trunnion supported rotary mills, de-lacquering drums, washers, debarking drums, pelletizers, coal breakers, granulators, incinerators, and shakeout drums, among others.

Conventionally, the spherical roller bearings 202 are fixed directly to the base 206, for example by hold down bolts 210. The spherical roller bearings 202 are capable of skew adjustment by the manual skew adjustors 208, such as adjusting screws. The adjusting screws allow for skew adjustment of the axis 212 of each of the rollers 204 with respect to the axis of the tire 214, as is known in form and structure in the art. Such skew adjustments are made while the equipment is rotating, with the hold down bolts 210 released enough to allow the spherical roller bearings 202 to slide (transverse to the axis of the roller) relative to the base 206. Some spherical roller bearings 202 are not mounted to the base 206 by hold down bolts 210, but are still prevented from axial movement relative to the base 206 using keys (not shown).

When the roller 204, crosses its neutral axis, no axial travel is visible. This complicates the alignment of roller 204. Without identifying the location of a roller's neutral axis, alignment cannot be established. In this case, the problem is magnified because equipment similar to kilns, which employ spherical roller bearings, greatly outnumber kiln installations, by a factor of at least 100:1. These are, for example, rotary coolers, rotary dryers, balling drums, granulators, incinerators, or rotary washers. Most of these turn much faster, often 3 to 4 times faster, which makes alignment proportionately more critical.

FIG. 2B illustrates the conventional support assembly 250 having the sleeve bearings 252 and button style thrust bearings 254 for a roller shaft 256 supporting a roller 258. Conventionally, the neutral skew position of the sleeve bearings 252 is found not by measurement but by observing a shift of the roller 258 from one side (left, right) to the other in response to a few thousandths bearing position adjustment 260 of a skew adjustor 262. Observing the shift of the roller 258 happens when the bearing position adjustment 260 causes the roller 258 to cross its neutral skew position. When the roller 258 is skewed 260, a force is generated pushing the kiln 264 axially 266. As a response, the roller 258 pushes itself in the opposite direction 268. Each time the roller 258 crosses the neutral position the thrust force changes 180° and the roller 258 moves from one side to the other (left, right in FIG. 2B).

While the rotating axis of the kiln 264 is practically difficult to fix by measurement, the roller position with respect to being parallel to that axis may be established (e.g., to the nearest 1 thousandths of an inch) by observing the axial shift of the roller 258 when the roller 258 moves across its neutral axis.

Figure 3:
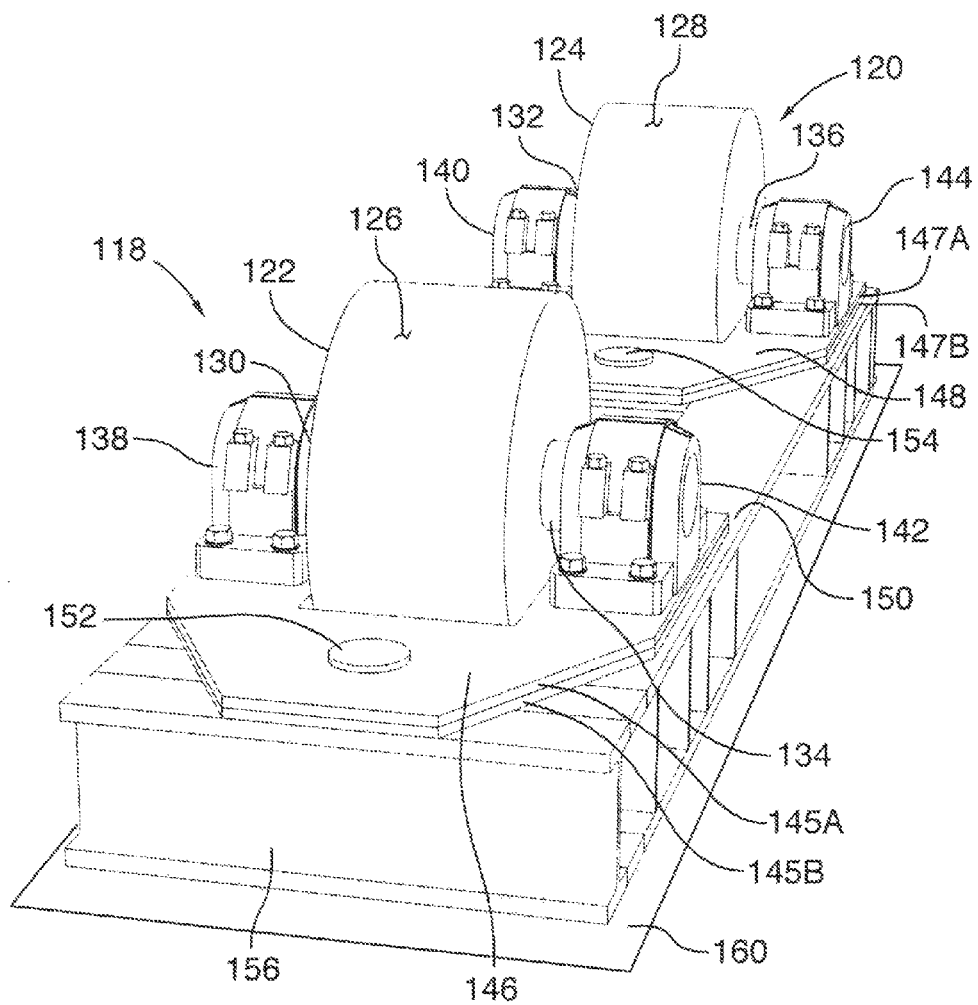
FIG. 3 is a perspective view of a pair of roller assemblies shown in FIG. 1.

Referring now to an embodiment of the present disclosure, FIG. 3 illustrates the roller assemblies 118 and 120 for supporting the bearing surface 114 of the rotating body 110. Each roller assembly 118 and 120 has a cylindrical roller 122 and 124, and each roller 122, 124 has a circumferential bearing surface 126 and 128, respectively, which is in supporting engagement with the bearing surface 114 of the tire 112.

Where the rotating body is inclined, each roller 122 and 124 has an upstream roller shaft extension (shaft extension 130 for roller 122, shaft extension 132 for roller 124) and a downstream shaft extension (shaft extensions 134 and 136 for rollers 122 and 124, respectively). As used herein, the "upstream" and "downstream" orientations are relative to the direction of material flow through the rotating body (from left to right in FIG. 3).

The shaft extensions 130, 132, 134, 136 are rotatably supported by bearings 138, 140, 142, 144, respectively. Bearings 138 and 142 are shown for shaft extensions 130 and 134 of roller 122 respectively. Bearings 140 and 144 are shown for the shaft extensions 132 and 136 of roller 124. Such bearings may be spherical roller bearings, as shown, sleeve bearings, or antifriction bearings, for example. Each bearing thus includes one of a pair of bearings for its respective roller. In the case of antifriction bearings, one bearing of the pair will contain a fixing ring and the other bearing of the pair will be a free bearing.

The bearings 138, 140, 142, 144 of each roller 122, 124 are fixedly mounted to a pivot plate 146, 148. The pivot plates 146, 148 are pivotally attached to a base 150 by a pivot pin 152, 154. The pivot plate 146, 148 allows the roller assembly 118, 120 to pivot about the pivot pin 152, 154. The pivot pin 152, 154 may be located on one side of the roller assemblies 122, 124. The pivot pin 152, 154 is located at the center of the roller 122, 124. The pivot pin 152, 154 may be located in line with the center of where the circumferential bearing surface 126, 128 is in contact with the bearing surface 114. The location of the pivot pin 152, 154 is dictated by the direction of roller rotation. The pivot pin 152, 154 is in front of the upturning side of the roller 122, 124. If the pivot pin 152, 154 were to be located in front of the down turning face of the roller 122, 124, the axial force generated by a misalignment would cause the roller 122, 124 to misalign even more and be forced out from under the tire 112 to one side or the other causing the system to fail.

Where the drum 100 is alternately rotated in both directions because of the process being performed, the self-alignment is done first with the drum 100 rotating such that the pivot pins 152, 154 are in front of the upturning face of the roller 122, 124. In this case, an axial adjustor (such as axial adjustor 188 and axial adjusting screw 190 of FIG. 10) must be employed on both sides of the pivot plate 146, 148 to lock the pivot plate 146, 148 in place, thereby enabling safe reverse rotation.

The pivot plate 146, 148 can be a simple mild steel plate or one that has the underside polished to reduce friction. In an embodiment, the pivot plate 146, 148 may also have two layers, a first layer 145A, 147A for supporting the bearings and a second layer 1458, 147B having low friction and high heat resistance such as Teflon. The load bearing or friction reducing configurations of the pivot plate 146, 148 may be determined, case by case, dependent on the equipment size, weight and speed etc.

The base 150 is typically formed from a steel frame made of heavy H-section steels channels which are welded together. As a retrofit, the base 150 includes a base extension 156 for providing an aperture for the pivot pin 152, 154. The base 150 and base extensions 156 are anchored to a foundation 160 which may take the form of a pier (such as piers 102, 104, 106 or 108) or a foundational pad. The foundation 160 is typically formed from concrete, and the base 150 is anchored to the foundation 160, either by fasteners such as bolts (not shown) or by forming the base 150 into the concrete of the foundation 160 itself.

FIG. 4 illustrates forces acting on the roller assembly 118 mounted on the pivot plate 146. The rotating body 110 rotates in a direction of rotation 162. An axial thrust load or force 164 on the rotating body 110 creates a consequent axial force reaction 166 on the roller assembly 118 created by an indicated skew 167.

If the roller 122 is not parallel to the rotating body 110, the roller 122 produces the axial thrust force 164 on the rotating body 110. As a reaction to the axial thrust force 164, the roller 122 drives itself in the opposite direction 166. The reaction is facilitated by the pivot plate 146, on which the roller assembly 118 is mounted and which is free to move about pivot axis 170 in response to the axial thrust force 166. The pivot plate 146 will therefore reposition itself due to the reactionary force 166 and drive itself towards the aligned position, which when reached, reduces the reactionary force 166 to zero. The roller assembly 118 is therefore self-adjusting as it continues to seek a neutral skew or aligned position as long as the rotating body 110 rotates and the pivot plate 146 is free to move. This self-adjusting reduces the roller support bearing thrust loading 164 to the minimum thereby minimizing friction and wear. This self-adjusting may also consequently eliminate the need to measure skew alignment or manually reposition rollers for that purpose (as described with reference to FIGS. 2A and 2B).

For good, reliable operation, the roller axis 172 of each roller 122 is parallel to the rotation axis 116 of the rotating body 110 resulting in a bearing position, for example, within zero and 20 thousandths of an inch from this neutral axis. The location of the rotation axis 116 of the rotating body 110, given that its length is often measured in hundreds of feet and diameters as large as 25 feet, is difficult to establish to a resolution of a thousandths of an inch. Consequently measuring the location of the roller axis 172 as to being parallel to the rotation axis 116 is equally difficult to establish. Correct support roller alignment may provide mechanical reliability. Support rollers such as these, which may each carry a load of hundreds of tons and be as much as 10 feet in diameter, it is only with a few thousandths of an inch bearing skew adjustment 168 which makes a difference between good operation and possible destruction.

Figure 5A:
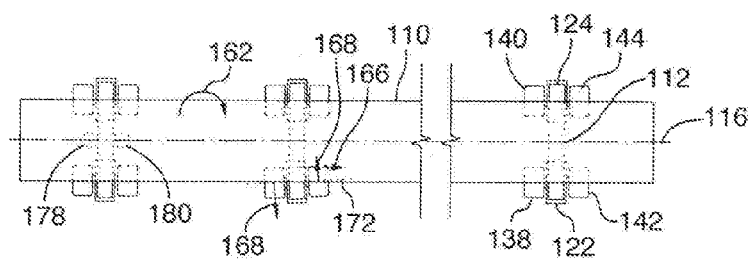
FIGS. 5A, 5B, and 5C are top, side, and end views, respectively, of the rotary kiln of FIG. 1.
Figure 5B:
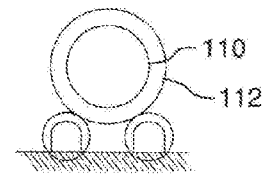
Figure 5C:
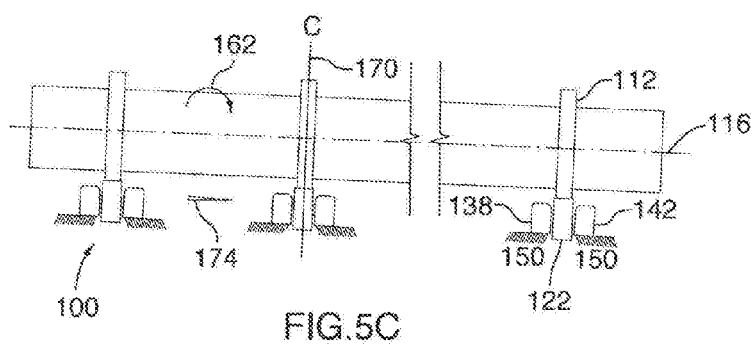

FIGS. 5A, 5B, and 5C illustrate the rotating body 110 installed on a slope 174. While three piers are shown, some kilns may have as many as 9 support piers with 9 pairs of support rollers while other units such as rotary dryers and coolers may have 2 piers.

No matter how carefully alignment measurements are made, problems still occur. The thrust forces 166 generated by badly aligned rollers 122 124 may be underestimated, for example the thrust forces 166 can easily shatter end caps 2" thick. Excessive thrust force 166 can also fracture bearing housings. Excessive thrust force 166 can shear the hold down mechanism of the support bearing 142 and push the bearing 142 off its base 150 axially. Excessive thrust force 166 is particularly risky when spherical roller bearings are employed.

The roller assembly uses the generated thrust force 166 generated by misalignment to push the roller 122 back to its neutral skew position (parallel to rotation axis 116). Since misalignment generates the thrust force 166, the thrust force 166 is used to drive the roller 122 towards its neutral position. The more misalignment the greater is the driving force. Once the roller 122 reaches its neutral position no thrust force 166 is generated hence the roller 122 continually seeks its neutral position.

Figure 6:
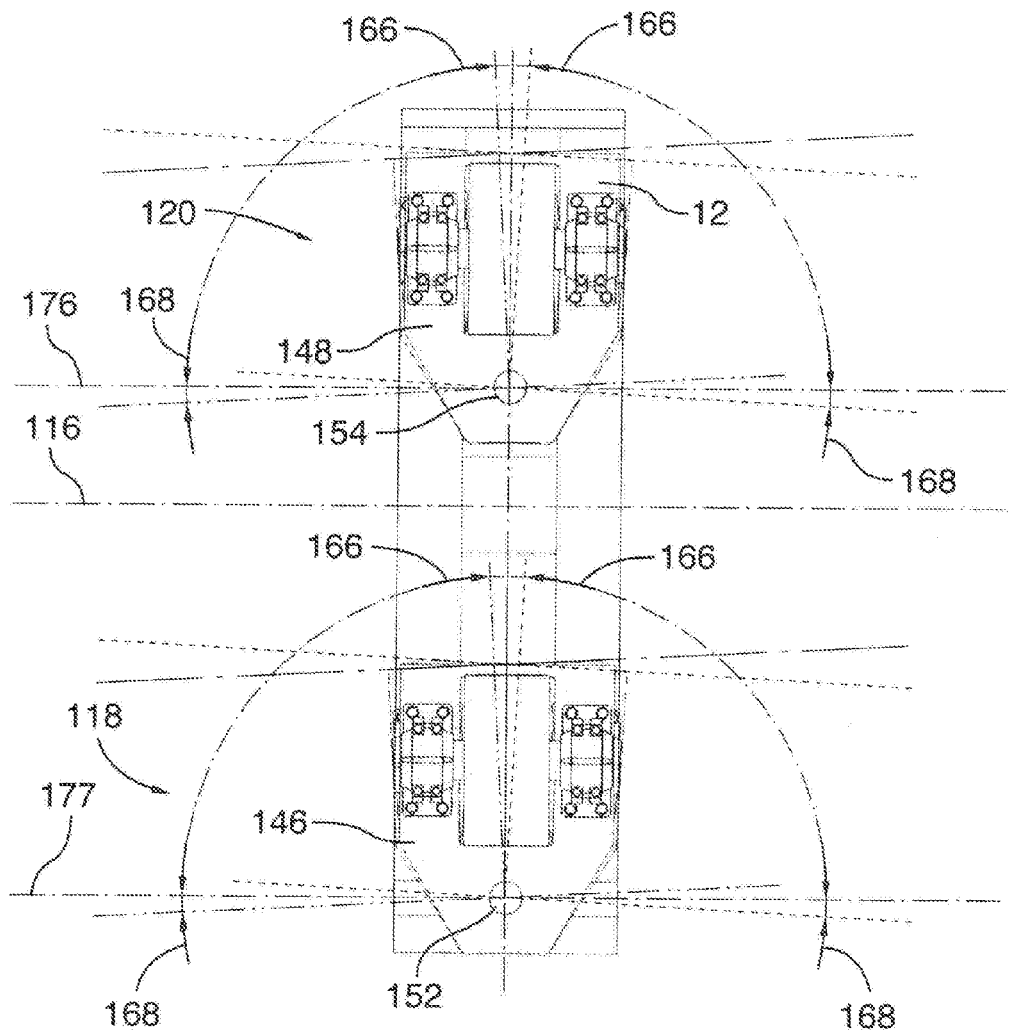
FIG. 6 is a top view of the pair of roller assemblies of FIG. 3 in a left orientation, a centered orientation, and a right orientation, respectively.

Referring to FIG. 6, illustrated therein is the roller assemblies 118, 120 fitted with pivot plates 146, 148, in a left orientation, a centered orientation, and a right orientation. The rotation axis 116 of the kiln, the neutral axis of each support roller 172, 176, and the pivoting action and direction 166 in response to skew conditions are shown.

On installation, the roller assembly 118, 120 most likely will be in some state of skew 168 (e.g., left orientation), generating the thrust force 166 on the roller assembly 118, 120. This thrust force 166 actively pivots the roller assembly 118, 120, about the pivot pin 152, 154 towards its neutral position (e.g., centered orientation) along roller axis 172, 176, which, when reached, reduces the thrust force 166 to zero. Should the skew 168 of the roller be opposite (e.g., right orientation), the thrust force 166 will also be opposite and therefore move the roller to neutral (e.g., centered orientation), as before.

Figure 7A:
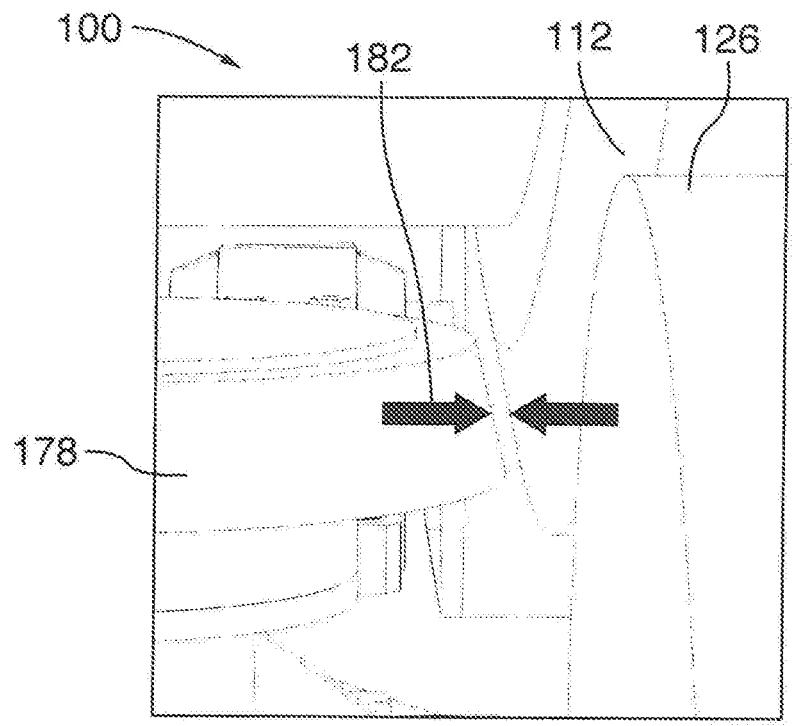
FIGS. 7A and 7B are close up views of a roller assembly having thrust rollers in accordance with an embodiment.
Figure 7B:
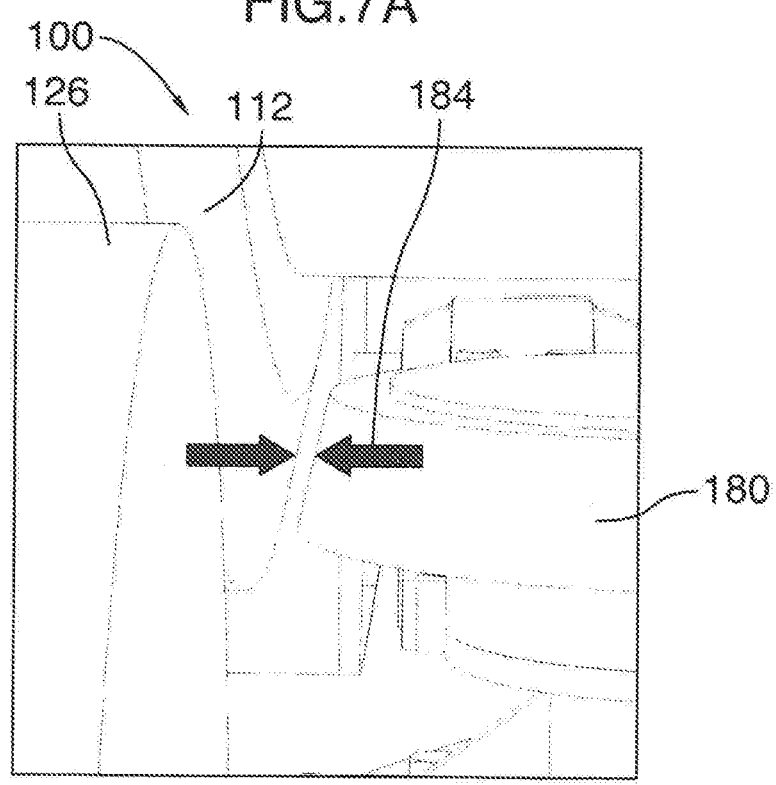

Referring to FIGS. 7A and 7B, illustrated therein is the rotary drum 100 without slope, set horizontally. FIG. 7B may also be a close up view of, for example, FIG. 8. The rotary drum 100 includes a pair of thrust rollers 178, 180 exhibiting gaps 182, 184 between the thrust rollers 178, 180 and the tire 112. The rollers 122, 124 are set to neutral skew that it runs between the pair of thrust rollers 178, 180 (also illustrated in FIG. 5A).

With level units the rollers 122, 124 are purposely left running in the neutral position. The tire 112 runs between the left 178 and right 180 thrust rollers such that there are gaps 182, 184 present to either side of the tire 112.

Figure 8:
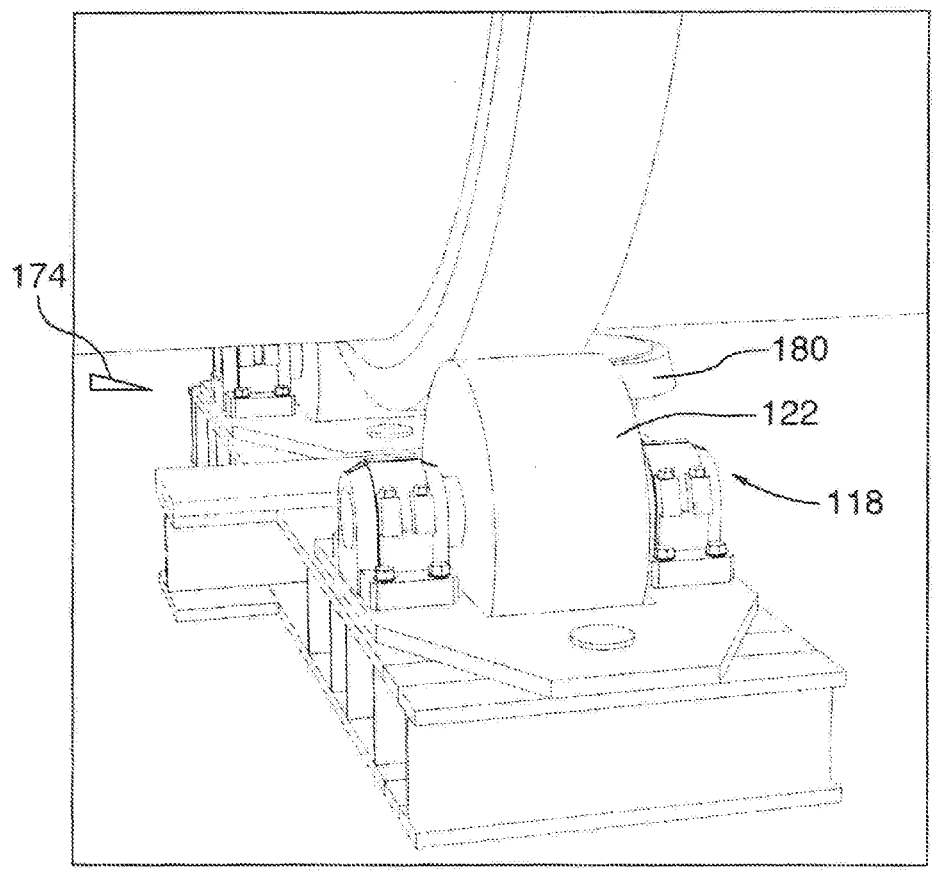
FIG. 8 is a perspective view of a roller assembly having lower thrust rollers in accordance with an embodiment.

Referring to FIG. 8, illustrated therein the rotary drum 100 installed on a slope 174 relative to the horizontal. The roller assembly 118 does not need axial balance, as the rollers 122 are set with neutral skew, and will run continuously on the downhill thrust roller 180.

With 100% thrust arrangements or hydraulic thrust rollers, which are installed on a slope 174, the rollers are still kept neutral but because of gravity the downhill thrust roller 180 will be in full contact and running continuously. With these designs there typically is no upper thrust roller (178).

Figure 9:
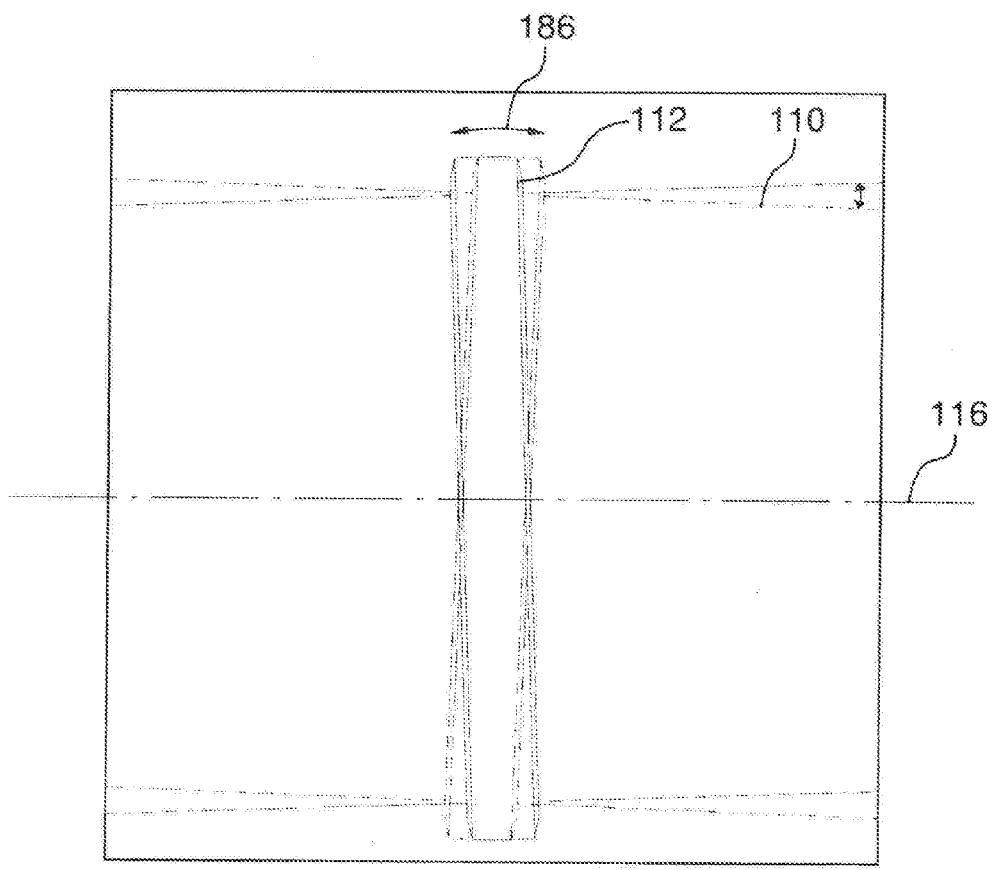
FIG. 9 is a top view of a rotating body showing tire wobble.

FIG. 9 illustrates an exaggerated illustration of tire 112 wobble or axial run-out 186. Tolerance for axial run-out may be set at about 0.001 to 0.002 inches per foot of tire diameter. For example, a 20' diameter tire may be expected to have about 0.020"-0.040" total axial run-out 186. Wobble of the tire 112 is usually always present, either due to allowable installation tolerance or due to non-uniform shell temperature profiles which, when present, causes the shell 110 to bend, if only temporarily. The tire 112 being mounted on the shell 110 that has bends, transient or permanent, will in turn cause the tire 112 to wobble. As a result, the tire 112 rotation axis 116 constantly changes during rotation. The pivoting roller assemblies 118, 120 mounted on the pivot plates 146, 148 allow the position of the roller axis 172 to dynamically respond and move with the tire rotation axis 116, constantly seeking to maintain a zero thrust load.

Further, tires 112 are never mounted perfectly straight on the shell 110 and the shell 110 can also develop bends in it. As a result, tires 112 exhibit axial wobble 186. With neutrally skewed rollers 122, 124 and with an unrestrained pivot plate 146, 148 the roller assemblies 118, 120 will continually seek their neutral position and are therefore in constant motion to stay centered on the tire 112. Because the shell 110 is not a level unit, gravity will cause the shell 110 to run downhill 174 thereby running with full pressure on the downhill thrust roller 180.

Figure 10:
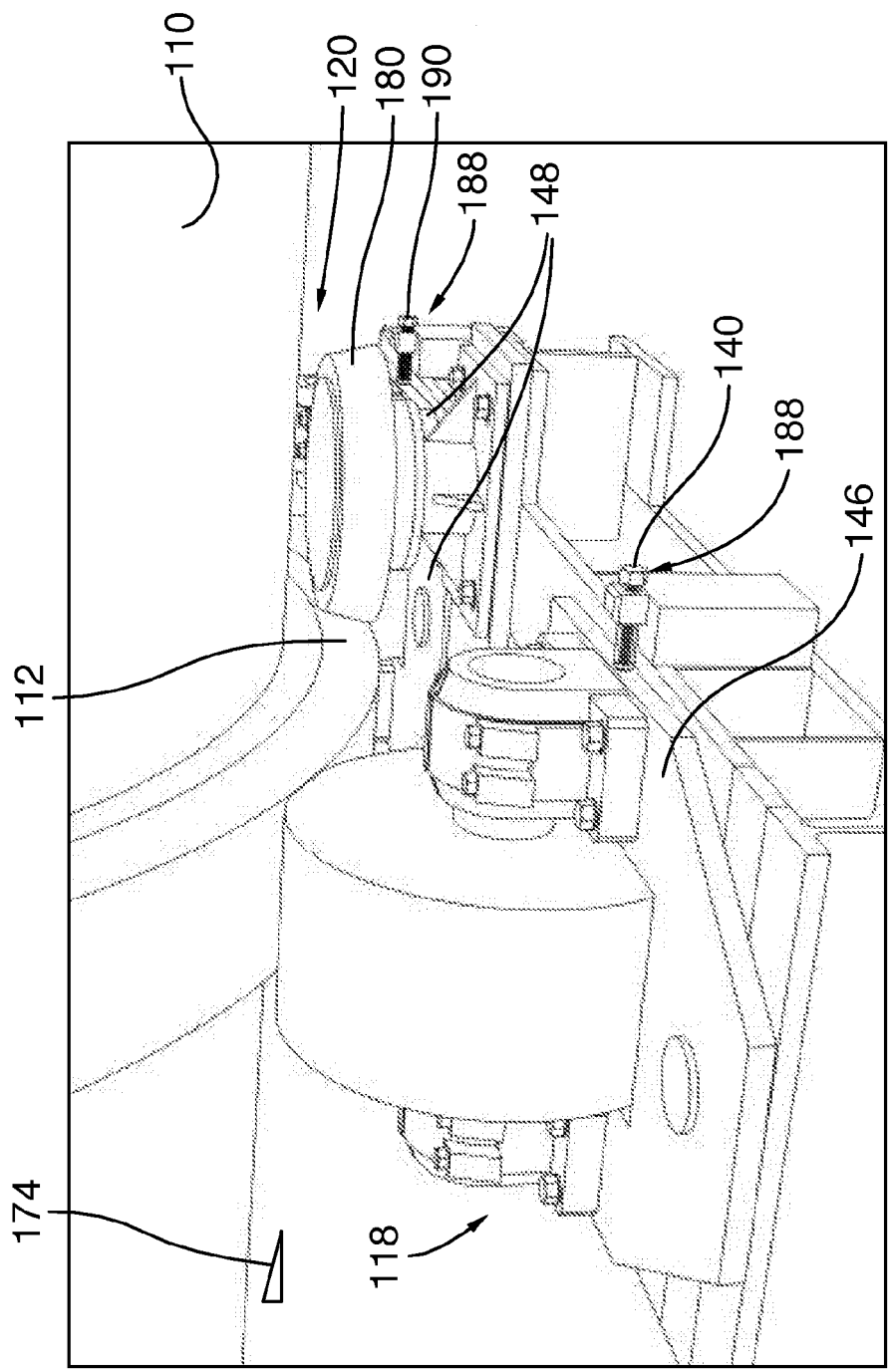
FIG. 10 is a perspective view of a roller assembly having an axial adjustor, in accordance with an embodiment.

Referring to FIG. 10, illustrated therein is a shell 110 installed on a slope 174. Many units, kilns, rotary coolers, rotary dryers and so on are designed to run with axial balance. The roller assemblies 118, 120 each have an axial adjustor 188 to fix any axial balance. The axial adjustor 188 is installed to fix the pivot plate 146, 148 for each roller assembly 118, 120 such that the combined thrust generated by all the roller assemblies 118, 120 equals the gravitational pull on the unit downhill. This provides the ability to downsize the downhill thrust roller 180 and assembly, thereby saving capital cost of the equipment. Conversely, should the axial adjustor 188 on the pivot plate 146, 148 be released, the roller assembly 118, 120 would re-align itself to its neutral skew axis.

The axial adjustor 188 locks the pivot plate 146, 148 with an axial fixing screw 190 to establish axial balance of the shell 110. Once the roller assembly 118, 120 has pivoted on the pivot plate 146, 148 and the roller assembly 118, 120 has been allowed to self-align the axial fixing screw 190 is engaged to lock the pivot plate 146, 148 and incrementally add skew. Small adjustments are made by the axial fixing screw 190 on each roller assembly 118, 120 sequentially and repeatedly until axial balance is attained and the rotation of the pivot plate 146, 148 is fixed in one rotation direction. Axial balance is attained when the thrust tire 112 is seen to momentarily lose contact with the downhill thrust roller 180 during each rotation. With only one axial fixing screw 190 per roller assembly 118, 120 it is not possible to misadjust the roller assemblies 118, 120 to add to gravitational push.

Alignment is greatly simplified because releasing the pivot plate 146, 148 causes the roller assembly 118, 120 to align itself. Small incremental and sequential skew is added to each roller until momentary lift-off from the downhill thrust roller 180 is achieved.

Figure 11A:
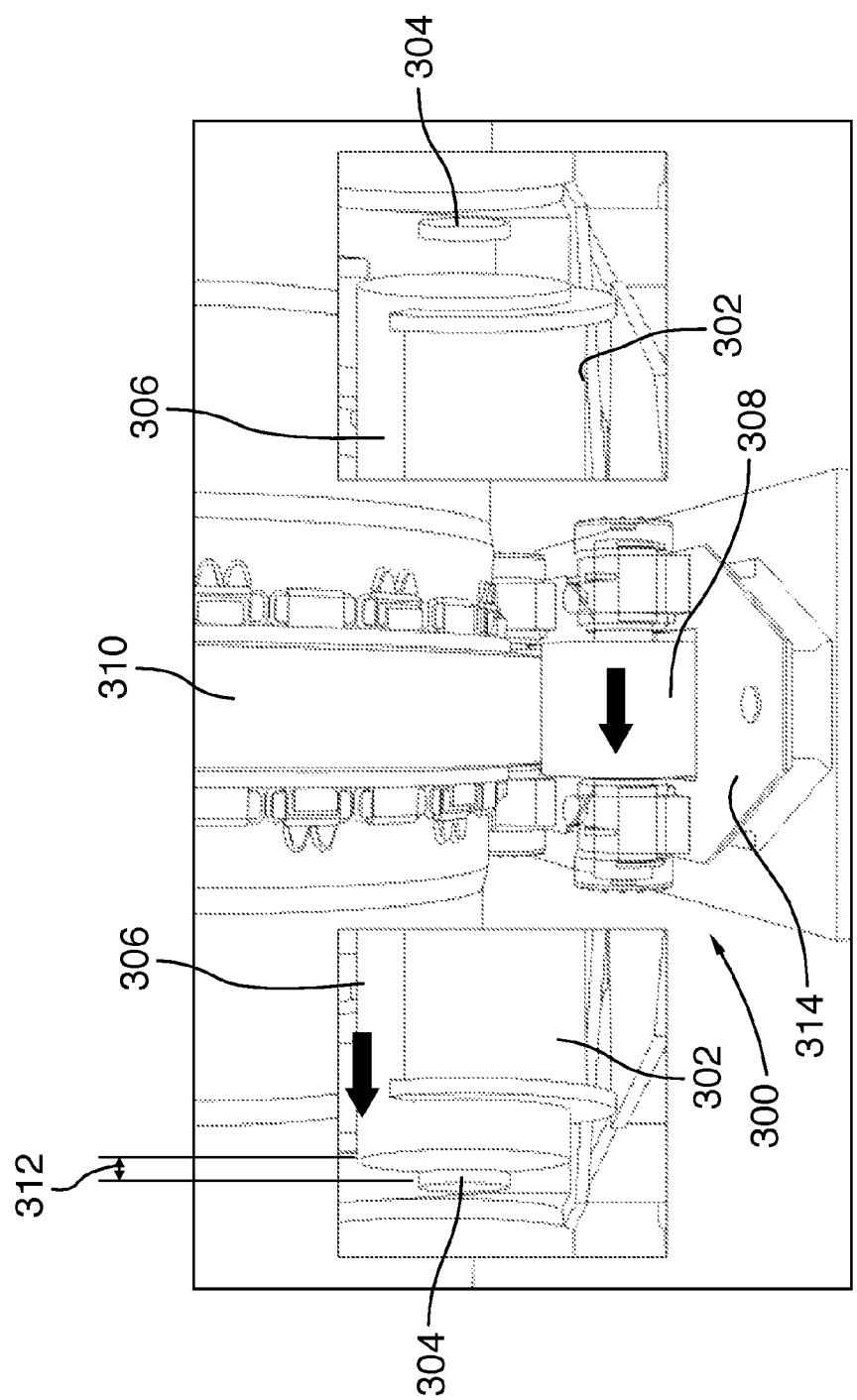

Referring to FIGS. 11A and 11B, illustrated therein is a support assembly 300, similar in some aspects to the system of FIG. 3 except having sleeve bearings 302 and button style thrust bearings 304 for a roller shaft 306 that supports a roller 308. Given the inevitable axial run-out of a tire 310, the roller shaft 306 is free to travel back and forth axially along the sleeve bearings 302 with each rotation of the tire 310. The distance between the left and right shaft thrust bearings 304 is typically ¼" to ½" greater than the length of the roller shaft 306. Since the axial run-out of the tire 310 is expected to be an order of magnitude smaller, the axial travel 312 (e.g., from FIG. 11A to FIG. 11B) of the roller shaft 306 is not expected to cause a pivot plate 314 to move.

The support assembly 300 allows free axial travel of the roller shaft 306 in the sleeve bearings 302 when such are used with 100% thrust kilns. Tires 310 inevitably exhibit some axial run-out, which, when within tolerance, is approximately 0.001" per foot of tire diameter. Given a tire 310 with 20 foot diameter will mean an axial wobble is approximately 0.020". The roller 308 fitted with the sleeve bearings 302 and the pivot plate 314 will align itself such that the pivot plate 314 centers itself and then stops moving. The sleeve bearing 302 allows the roller shaft 306 to float 0.020" within the housings without causing the pivot plate 314 to move. This reduces the tendency to develop grooves and ridges between the roller shaft 306 and sleeve bearings 302 thereby reducing the tendency to create hot bearings. This is a further benefit that may extend the service life of the support assembly 300.

Shaft thrust bearings or buttons 304, as illustrated, are one of a few different bearing configurations that exist. The principle of operation of shaft thrust bearings or buttons 304 and the function of the pivot plate 314 still applies to this embodiment.

Finally, if the support assembly 300 is used on 100% thrust or hydraulic thrust kilns with the sleeve bearings 302, axial adjustors (for example, axial adjustors 188 of FIG. 10) would not be necessary. 100% thrust kilns and kilns with thrust rollers fitted with hydraulic rams are designed to run with support rollers in their neutral skew position. FIGS. 11A and 118B show that the roller shaft would travel left (FIG. 11A) to right (FIG. 11B) or up-hill to downhill between but not necessarily touching the shaft thrust bearings 304, in phase with each shell rotation. As a result grooving of the roller shafts 306 and sleeve bearings 302 is minimized reducing the tendency to create hot bearings.

Figure 12A:
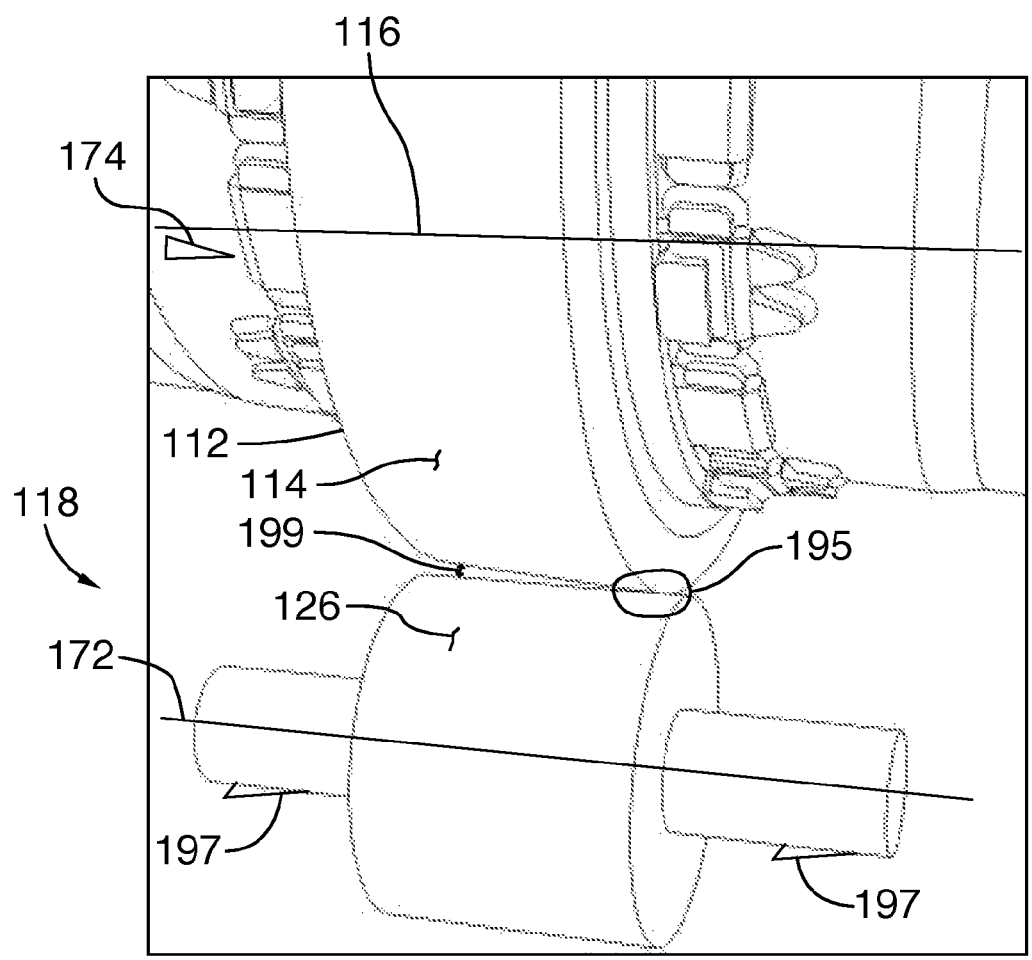
FIGS. 12A and 12B are perspective views of a roller assembly having a shim, in accordance with an embodiment.
Figure 12B:
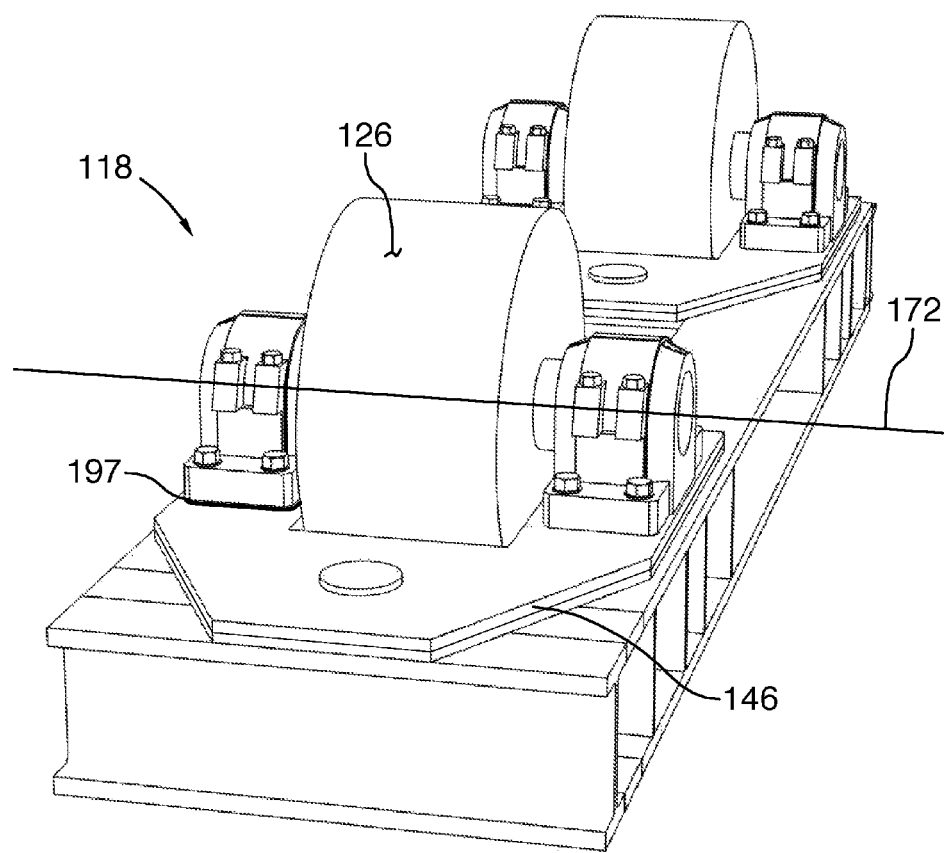

Referring to FIGS. 12A and 12B, illustrated therein is a close up of support assembly 118. The support assembly 118 supported by the pivot plate 146 enables a method that reveals the correctness of the support roller slope 172 or inclination relative to the rotation axis. Where the drum 110 is installed on an incline 174, the slope, which is typically in the range of 1% to 3%, each supporting roller 118 is on the same slope. Where the slope of the roller 172 and the slope of the drum axis 116 are not the same, there may be a lack of sufficient face contact. As that the supporting load can be in hundreds of tons, any difference in slope increases wear and reduces service life. With the pivot plate that provides self-alignment of the roller assembly 118, the roller assembly 118 seeks and arrives in the neutral skewed position. In the neutral skew position and given that the rolling faces 126 of both supporting roller 118 and supported tire 112 are designed to be flat and cylindrical (which will be the case for new and/or reconditioned equipment), any persistent lack of uniformity of contact from one side to other is caused where the roller slope 172 does not match the prevailing tire slope 116. This lack of uniformity creates a gap 199 between the roller 118 and the tire 112. The gap 199 can be measured using a conventional feeler gauge and a calculated corrective shim 197 can be placed under the support roller 118.

The gap 199 prevails throughout rotation. When the pivot plate is free to move the roller 118 is in the self-aligned position. Given that the rotating components, both the tire 112 and the support roller 118, are in a new or reconditioned state, that is their contacting surfaces are both flat and cylindrical, any such gap 199 results when the inclination of the roller 172 does not match the inclination of the tire 112. This gap 199 is measured and used to establish corrective measures. In the case of spherical roller bearings, the roller bearings include shims 197 to level the spherical roller bearings. In the case of larger kilns employing sleeve bearings (e.g. FIGS. 11A and 11B) shim 197 placement may not be possible and the roller support base 118 is reset. If the gap 199 is not removed, excessive wear and shortened service life of the components may occur at 195.

While the above description provides examples of one or more apparatus, methods, or systems, it will be appreciated that other apparatus, methods, or systems may be within the scope of the claims as interpreted by one of skill in the art.

The invention claimed is:

1. An apparatus for rotatably supporting a rotating cylindrical body, the apparatus comprising:
   a pair of roller assemblies for supporting an annular bearing surface of a rotating cylindrical body, each of the roller assemblies comprising:
   a cylindrical roller having a circumferential bearing surface in supporting engagement with the annular bearing surface of the rotating body;
   first and second shaft extensions extending from the roller;
   bearings for rotatably supporting the first and second shaft extensions; and
   a pivot plate for supporting the bearings, the pivot plate being pivotally attached to a base by a pivot pin such that the cylindrical roller self-adjusts to the annular bearing surface of the rotating body.

2. The apparatus of claim 1, wherein the pivot pin is located in line with the center of where the circumferential bearing surface is in contact with the annular bearing surface.

3. The apparatus of claim 1, wherein the pivot plate is mounted such that if the rotation axis of the roller is not parallel to the rotation axis of the rotating body, the roller produces an axial thrust force on the rotating body, and the pivot plate pivots to drive the roller in the opposite direction as a reactionary force to the axial thrust force.

4. The apparatus of claim 3, wherein the pivot plate pivots due to the reactionary force and is driven towards an aligned position, which when reached, reduces the reactionary force to zero.

5. The apparatus of claim 1, wherein the base includes a base extension for supporting the pivot pin, and wherein the base is anchored to a foundation.

6. The apparatus of claim 1, wherein the rotating body is horizontal, and wherein the apparatus includes a pair of thrust rollers exhibiting gaps between the thrust rollers and the bearing surface.

7. The apparatus of claim 1, wherein the pivot plate has an underside with reduced friction.

8. The apparatus of claim 1, wherein the pivot plate has two layers, a first layer for supporting the bearings and a second layer having low friction and high heat resistance.

9. The apparatus of claim 1, wherein the rotating body is installed on an incline relative to the horizontal and wherein the apparatus includes a downhill thrust roller in full contact and running continuously on the bearing surface.

10. The apparatus of claim 1, wherein the rotating body is installed on an incline relative to the horizontal and wherein each roller assembly has an axial adjustor to fix the pivot plate for each roller assembly such that the combined thrust generated by all the roller assemblies equals the gravitational pull on the rotating body.

11. The apparatus of claim 10, wherein the axial adjustor locks the pivot plate with an axial fixing screw to establish axial balance of the rotating body.

12. The apparatus of claim 1, wherein the bearings are spherical roller bearings.

13. The apparatus of claim 1, wherein the bearings are sleeve bearings and button style thrust bearings.

14. The apparatus of claim 13, wherein the support assembly allows free axial travel of the shaft extensions in the sleeve bearings when the rotating body is a 100% thrust kiln.

15. The apparatus of claim 1, wherein where a lack of uniformity of contact between the bearing surface of the rotating body and the circumferential bearing surface creates a gap between the roller and the bearing surface, and the apparatus further comprises a corrective shim placed under the bearings sized to angle the roller assembly based on the size of the gap.

16. The apparatus of claim 1, wherein the pivot pin has a pivot axis that is generally perpendicular to the axis of rotation of the rotating body.

17. The apparatus of claim 1, wherein the rotating body has a tire having the bearing surface, wherein the tire is mounted on the rotating body having bends causing the tire to wobble, and wherein the roller assemblies pivot on the pivot plate to allow the position of a roller axis to dynamically respond and move with a tire rotation axis, seeking to maintain a zero thrust load.

18. The apparatus of claim 1, wherein the rotating body includes any one of a rotary kiln, a rotary cooler, a rotary dryer, a rotary furnace, a rotating reactor, a rotary filter, a bean conditioner, a corn conditioner, a rotary ash cylinder, a trunnion supported rotary mill, a de-lacquering drum, a washer, a debarking drum, a pelletizer, a coal breaker, a granulator, an incinerator, or a shakeout drum.

19. A roller assembly for supporting an annular bearing surface of a rotating cylindrical body, the roller assembly comprising:
a cylindrical roller having a circumferential bearing surface in supporting engagement with the annular bearing surface of the rotating cylindrical body;
first and second shaft extensions extending from the roller;
bearings for rotatably supporting the first and second roller shaft extensions; and
a pivot plate for supporting the bearings, the pivot plate being pivotally attached to a base by a pivot pin such that the cylindrical roller self-adjusts to the annular bearing surface of the rotating body.

20. The roller assembly of claim 19, wherein the pivot pin is located in line with the center of where the circumferential bearing surface is in contact with the annular bearing surface.

* * * * *